UNITED STATES PATENT OFFICE.

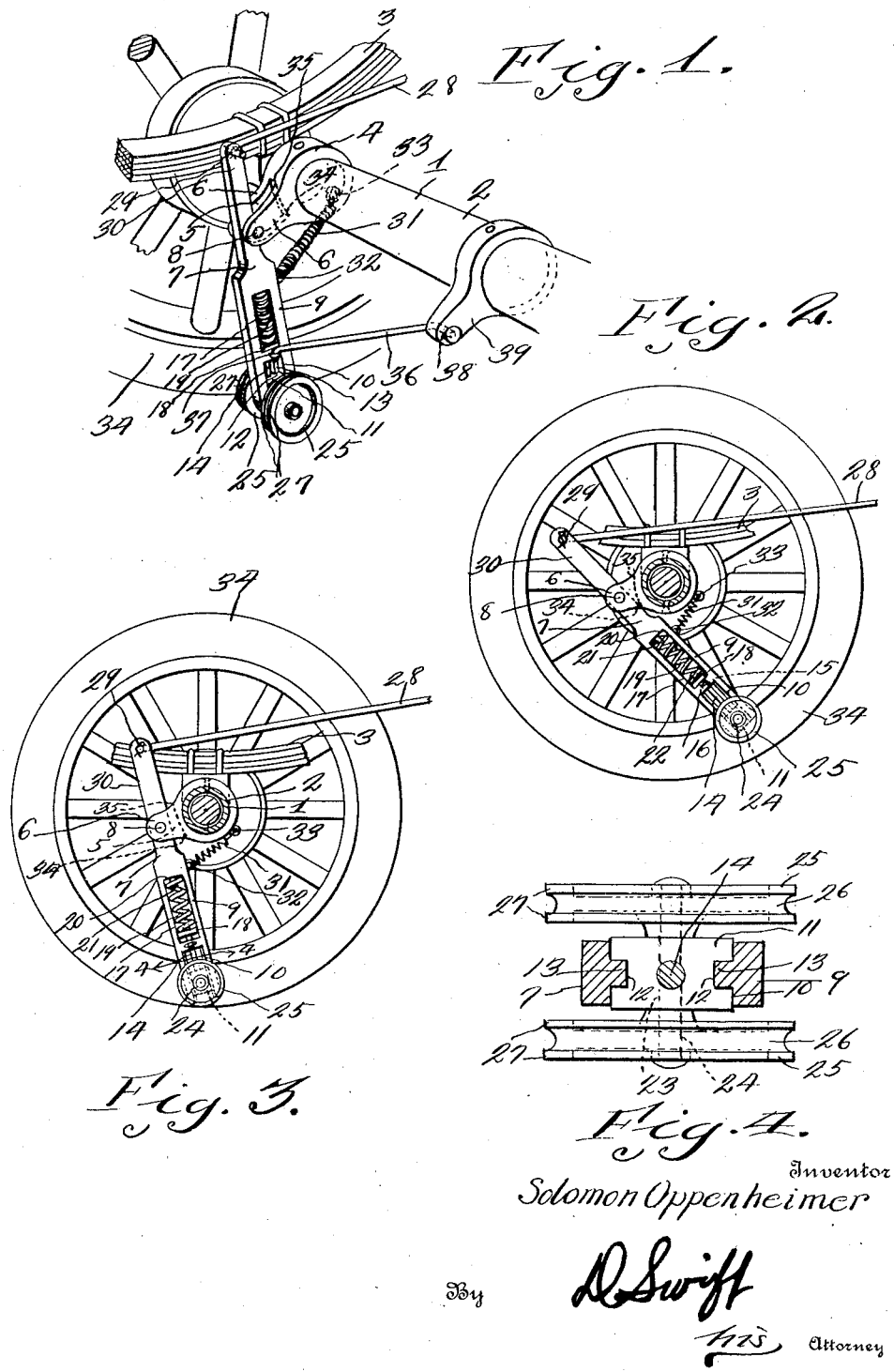

SOLOMON OPPENHEIMER, OF WASHINGTON, DISTRICT OF COLUMBIA.

ANTISKIDDING DEVICE.

1,338,036.	Specification of Letters Patent.	Patented Apr. 27, 1920.

Application filed October 10, 1919. Serial No. 329,676.

*To all whom it may concern:*

Be it known that I, SOLOMON OPPENHEIMER, a citizen of the United States, residing at Washington, in the District of Columbia, have invented a new and useful Antiskidding Device; and I do hereby declare the following to be a full, clear, and exact description of the invention, such as will enable others skilled in the art to which it appertains to make and use the same.

The invention relates to devices for preventing the skidding of motor driven vehicles and has for its object to provide a lever carried by the rear axle, preferably adjacent the spring support thereof, said lever having at its lower end a pair of rollers adapted to be forced into engagement with the ground by means of mechanism carried adjacent the operators' seat so that the skidding of the vehicle may be stopped or prevented.

A further object is to provide an antiskidding device for motor driven vehicles comprising a pivoted lever, said lever being pivoted on the rear axle of the vehicle. The lower end of said lever being provided with a pair of spaced rollers resiliently supported in a cross head carried by the lower end of the lever, said cross head being provided with a rod slidably mounted in the lever and engaging a coiled spring which coiled spring normally holds the cross head outwardly and is adapted to be compressed upon contact with the ground. Also to provide spring means for normally holding the pivoted lever upwardly and its wheels out of engagement with the ground.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1 is a perspective view of one end of the rear axle showing the anti skidding device applied thereto.

Fig. 2 is a sectional view through the axle and showing the device in side elevation applied thereto.

Fig. 3 is a view similar to Fig. 2 showing the ground engaging wheels in engagement with the ground.

Fig. 4 is a sectional view taken on line 4—4 through the lower end of the pivoted lever.

Referring to the drawings, the numeral 1 designates the rear axle of a vehicle which may be of any type and 2 the casing thereof. The rear axle is supported by a spring 3 which is connected thereto. Secured to the casing 2 in any suitable manner, is a bracket 4, which bracket is provided with a bifurcation 5, between the ears 6 of said bifurcation a lever 7 is pivoted as at 8. The arm 9 of the lever is preferably enlarged and has its lower end cutaway as at 10 so as to form a cross head guide for a cross head 11, which cross head is provided with channels 12 adapted to receive the flanges 13 in the cross head guide, so that said cross head may move longitudinally within the guide. Extending upwardly from the cross head 11 is a rod 14 which passes through and is slidably mounted in a bearing 15 of a transversely disposed bridge 16 which bridge is formed by the upper end of the cutaway portion 10 and the rectangular shaped opening 17 in the arm 9. The upper end of the rod 14 is provided with a head 18 and against which head the lower end of the coiled spring 19 engages. The upper end of the spring 19 engages the upper end 20 of the opening 17 and is held in place by lugs 21 and 22 which are carried by the upper end 20 of the opening 17 and the upper face of the head 18. It will be seen that as the cross head 11 moves longitudinally in the opening 10 that the coiled spring 19 will be compressed and also that said coiled spring will normally hold the cross head 11 in its outward position as shown in Fig. 2. Extending transversely through the cross head 11 and rotatably mounted in a bearing 23 therein is a pin 24, said pin having rotatably mounted on the ends thereof ground engaging wheels 25, which wheels are adapted to be forced downwardly into engagement with the ground when it is desired to prevent the skidding of the vehicle. Wheels 25 are provided with annular grooves 26 thereby forming on each wheel a pair of flanges 27 which engage the ground and bind against the same. The irregularities of the ground will allow the flanges 27 of the wheels 25 to grip the same and the spring 19 will cause said flanges to remain in constant engagement with the ground according to the irregularities. By providing a pair of wheels spaced apart it will be seen that the gripping of the ground will be accomplished at different points, thereby allowing one wheel to overcome the tendency of the other wheel to skid if one wheel should be on a hard smooth surface for instance a rock or car track. The spring 19 also allows a resilient holding of the wheels in engagement with the ground when pressure is applied to any kind of actuating mechanism which may be connected to the connecting rod 28 and located within the vehicle. The connecting rod 28 is pivotally connected as at 29 to the arm 30 of the lever 7 and may be operated by any suitable means such for instance as a foot or hand lever. The arm 9 is normally held upwardly and out of engagement with the ground by means of a coiled spring 31, one end of which is connected as at 32 to the arm 9 and the other end as at 33 to the bracket 4. The spring 31 being of sufficient strength to hold said lever out of engagement with the ground and also strong enough to prevent the pivoting of the lever as the wheels 34 of the vehicle pass over rough ground during ordinary driving of the vehicle.

The upward movement of the arm 9 is limited by means of the same coming in contact with the shoulder 34 of the bifurcation 5 and the rearward movement of the arm 9 is prevented by the arm 30 coming in contact with the shoulder 35 of the bifurcation 5, said shoulder being so positioned that it will be impossible for the lever as a whole to pass through a vertical line through its pivotal point. The lever 7 is provided with a side brace 36 which takes up the strain and prevents the breaking of the lever 7. The brace 36 is pivotally connected as at 37 to the arm 9 and has its other end pivoted as at 38 to a bracket 39 secured in any suitable manner to the casing 2 of the rear axle. The pivotal point 38 is in alinement with the pivotal point 8, therefore it will brace the lever 7 in any position said lever may assume.

From the above it will be seen that an anti skidding device is provided whereby there will be a multiple of wheels engaging the ground and resiliently held in engagement therein and also one wherein said wheels are carried by a single lever which is rigidly braced so that said wheels will at all times remain in engagement with the ground during the stopping or prevention of skidding.

The invention having been set forth what is claimed as new and useful is:—

1. An anti-skidding device for motor driven vehicles comprising a lever pivoted rearwardly of the rear axle in a bracket carried by the axle, said lever being pivoted in a bifurcation of the bracket, the lower end of the lever being inclined downwardly and forwardly, the upper end of the bracket inclining upwardly and rearwardly and terminating at a point above the axle, the lower end of the downwardly and forwardly extending end of the lever being provided with resiliently mounted ground engaging elements, the bottom of the bracket bifurcation being so positioned that when the ground engaging elements are in raised position the bottom edge of the bifurcation will limit the upward movement of the lower end of the lever, the bottom of said bifurcation also being so positioned that when the lower end of the lever is forced downwardly, the lever will be prevented from passing beyond a vertical center line through the pivotal point of the lever, means connected to the upper end of the lever whereby said lever may be rocked to throw the ground engaging elements into and out of engagement with the ground, and a spring connected to the forward side of the downwardly extending ends of the lever and having its other end connected to the axle forward of the lever, said spring forming means for assisting in raising the lower end of the lever.

2. An anti skidding device for motor driven vehicles, comprising a lever pivoted in a bifurcation of a bracket carried by the rear axle of a vehicle, the lower end of said lever having a cross head guide, a cross head mounted in said guide, wheels carried by the cross head and adapted to be forced into engagement with the ground, an opening in the lower arm of the lever above the cross head guide, a rod carried by the cross head and having a bearing between the cross head guide and the opening in the lever, the upper end of said rod being provided with a head, a coil spring disposed within the opening above the cross head guide and adapted to hold said rod head normally outwardly and also the cross head thereby resiliently supporting the wheels when they are in engagement with the ground, spring means for normally holding the downwardly extending arm out of engagement with the ground, the bottom of the bifurcation forming limiting stops for the pivoted lever in its upward and downward position and means connected to the upwardly extending arm of the pivoted lever for forcing the ground engaging wheels into engagement with the ground.

In testimony whereof I have signed my name to this specification.

SOLOMON OPPENHEIMER.